United States Patent
Ohki (10) Patent No.: US 6,831,694 B2
(45) Date of Patent: Dec. 14, 2004

(54) IMAGE PROCESSING APPARATUS, IMAGE PROCESSING METHOD AND STORAGE MEDIUM

(75) Inventor: Mitsuharu Ohki, Tokyo (JP)

(73) Assignee: Sony Corporation, Tokyo (JP)

( * ) Notice: Subject to any disclaimer, the term of this patent is extended or adjusted under 35 U.S.C. 154(b) by 596 days.

(21) Appl. No.: 09/932,228

(22) Filed: Aug. 17, 2001

(65) Prior Publication Data

US 2002/0122132 A1 Sep. 5, 2002

(30) Foreign Application Priority Data

Aug. 17, 2000 (JP) .................................... P2000-247232

(51) Int. Cl.$^7$ ............................................. H04N 5/232
(52) U.S. Cl. .................................................... 348/349
(58) Field of Search .......................... 348/218.1, 219.1, 348/222.1, 345, 349, 351, 354, 355; 250/208.1; 282/254, 255

(56) References Cited

U.S. PATENT DOCUMENTS

| | | | | |
|---|---|---|---|---|
| 5,193,124 A | * | 3/1993 | Subbarao | .................... 382/255 |
| 5,227,890 A | * | 7/1993 | Dowski, Jr. | ................... 348/349 |
| 5,307,170 A | * | 4/1994 | Itsumi et al. | ............. 348/219.1 |
| 6,154,574 A | * | 11/2000 | Paik et al. | .................... 382/255 |
| 2004/0125228 A1 | * | 7/2004 | Dougherty | ................... 348/345 |

\* cited by examiner

*Primary Examiner*—Tuan Ho
(74) *Attorney, Agent, or Firm*—Bell, Boyd & Lloyd LLC

(57) ABSTRACT

An image processing apparatus and a method are disclosed in which images picked up on a plurality of image pickup planes having different distances to a lens are processed. The apparatus and method include: an acquiring element or step for acquiring a plurality of images of a target object picked up on the plurality of image pickup planes; a first computing element or step for computing weights of the plurality of images acquired by the acquiring element; a second computing element or step for computing averages of the plurality of images acquired by the acquiring element; and an image creating element or step for creating an optimum image of the target object by obtaining a weighted average based on the weights computed by the first computing element and on the averages of the plurality of images computed by the second computing element.

4 Claims, 9 Drawing Sheets

FIG. 10 und States Patent US 6,831,694 B2

IMAGE PROCESSING APPARATUS, IMAGE PROCESSING METHOD AND STORAGE MEDIUM

BACKGROUND OF THE INVENTION

The present invention relates to an image processing apparatus, an image processing method and a storage medium. More particularly, the invention relates to an image processing apparatus, an image processing method and a storage medium for creating a sharply-focused image by the use of a plurality of images having different degrees of defocusing.

Today, so-called auto-focus cameras are becoming the mainstream of photographic apparatuses. In operation, the auto-focus camera measures the distance to a target object, moves the lens into an optimum position relative to the measured distance (i.e., a lens position such that a focused image can be projected onto an image pickup plane), and takes a focused picture of the object.

A major disadvantage of the auto-focus cameras is their high price. Expensive parts are necessary for moving the lens to achieve focus.

The present invention has been made in view of the above circumstances and provides an apparatus and a method constituting a low-cost scheme that creates focused images of target objects without moving the lens.

SUMMARY OF THE INVENTION

In carrying out the invention and according to one aspect thereof, there is provided an image processing apparatus for processing images picked up on a number of different image pickup planes, each having a different distance to a lens. The apparatus includes: an acquiring element for acquiring a plurality of images of a target object picked up on the plurality of image pickup planes; a first computing element for computing weights of the plurality of images acquired by the acquiring element; a second computing element for computing averages of the plurality of images acquired by the acquiring element; and an image creating element for creating an optimum image of the target object by obtaining a weighted average based on the weights computed by the first computing element and on the averages of the plurality of images computed by the second computing element.

In a preferred embodiment, the image processing apparatus further includes an image pickup element for picking up images of the target object on the multiple different image pickup planes.

According to another aspect of the invention, there is provided an image processing method for use with an image processing apparatus for processing images picked up on a number of different image pickup planes each having a different distance to a lens. The method includes the steps of acquiring multiple images of a target object picked up on the multiple different image pickup planes; computing weights of the different images acquired in the acquiring step; computing averages of the multiple images acquired in the acquiring step; and creating an optimum image of the target object by obtaining a weighted average based on the weights computed in the first computing step and on the averages of the multiple images computed in the second computing step.

According to a further aspect of the invention, there is provided a storage medium which stores a computer-readable program for use with an image processing apparatus for processing images picked up on a number of different image pickup planes having different distances to a lens. The program embodies the steps of acquiring a number of different images of a target object picked up on the multiple different image pickup planes; computing weights of the multiple images acquired in the acquiring step; computing averages of the multiple images acquired in the acquiring step; and creating an optimum image of the target object by obtaining a weighted average based on the weights computed in the first computing step and on the averages of the multiple images computed in the second computing step.

Through the use of the inventive image processing apparatus, image processing method, and storage medium containing the inventive program, weights of multiple picked-up images of a target object are computed, and averages of these images are calculated. A weighted average is then computed on the basis of the computed weights and of the averages of the multiple images, whereby an optimum image of the target object is created.

Other objects, features and advantages of the invention will become more apparent upon a reading of the following description and appended drawings.

DETAILED DESCRIPTION OF THE INVENTION

Figure 1:
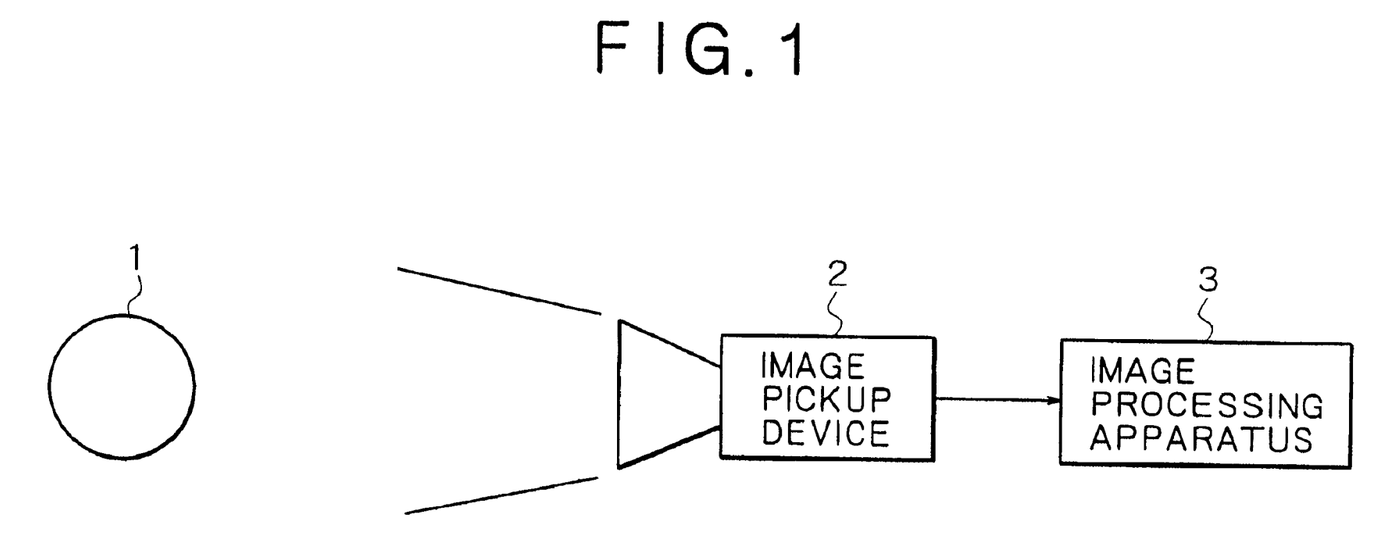
FIG. 1 is a schematic view of one embodiment of this invention.

FIG. 1 is a schematic view of one embodiment of this invention. For purposes of description, an image pickup device 2 and an image processing apparatus 3 are shown separately in FIG. 1. In practice, they may be integrated in a single enclosure.

A target object 1 is an object of which images are picked up. The image pickup device 2 includes CCDs (charge-coupled devices) 12-1 through 12-3 which have different distances from a lens 11 (see FIG. 2) and which pick up images of the target object 1. The image processing apparatus 3 creates a single focused image based on three images of the target object 1 picked up by the image pickup device 2.

Figure 2:
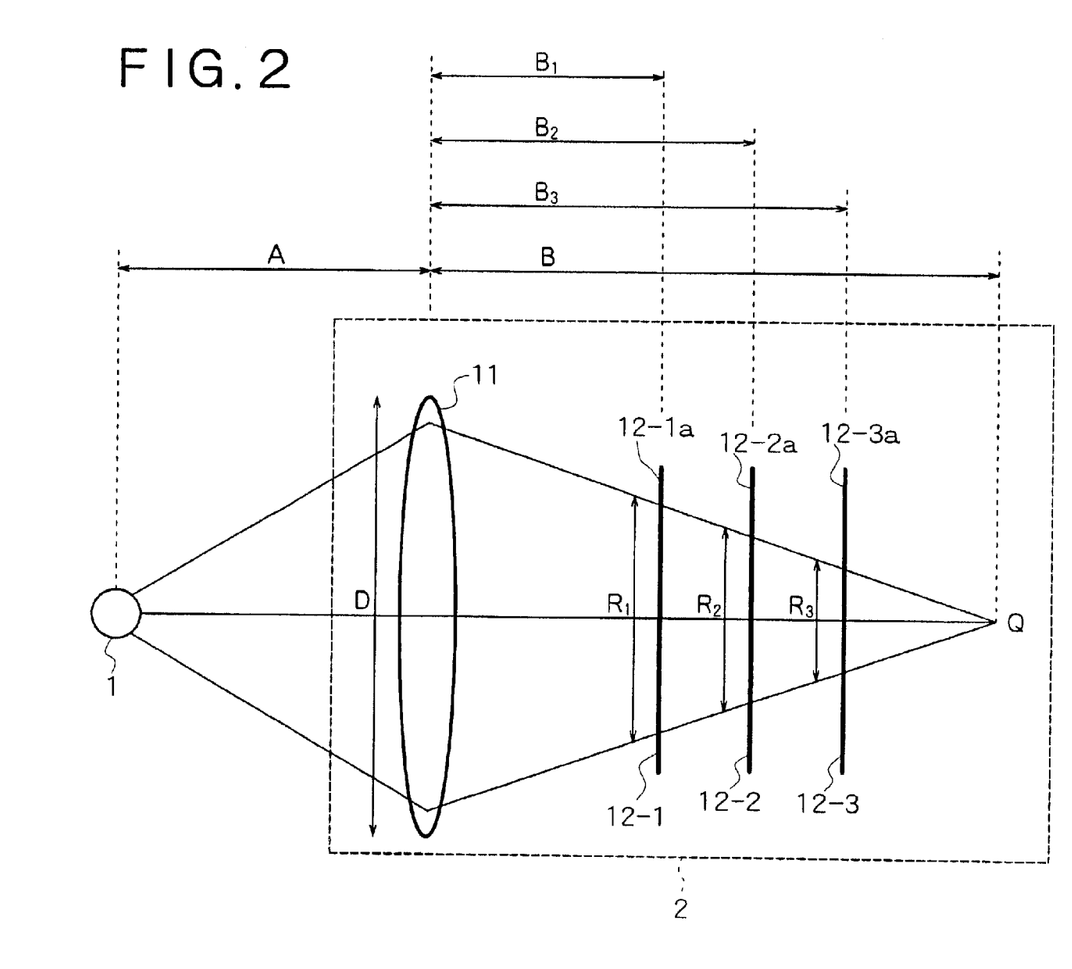
FIG. 2 is a schematic view showing a typical structure of an optical system in an image pickup device included in FIG. 1.

FIG. 2 is a schematic view showing a typical structure of an optical system in the image pickup device 2. Light coming from the target object 1 is directed by a lens 11 onto image pickup planes 12-1a, 12-2a and 12-3a of the CCDs 12-1, 12-2 and 12-3 respectively via half-mirrors, not shown. It is assumed that the lens 11 has a focal length Z, a diameter D, and a distance A to the target object 1.

The CCDs 12-1 through 12-3 are arranged so that distances (flange-back) differ between a mount reference plane of the lens 11 on the one hand and the image pickup planes 12-1a through 12-3a on the other hand. Thus positioned, the CCDs yield a plurality of picked-up images. It is assumed that reference characters $B_1$, $B_2$ and $B_3$ denote respectively the distances between the reference surface of the lens 11 on the one hand, and the image pickup planes 12-1a, 12-2a and 12-3a of the CCDs 12-1, 12-2 and 12-3 on the other hand. It is also assumed that reference character B stands for the distance between the reference surface of the lens 11 and a focal point Q of the target object 1 and that the relationship $B_1<B_2<B_3<B$ exists.

The distances $B_1$ through $B_3$ are fixed and remain constant regardless of the distance A. The difference between the distances $B_1$ and $B_2$ as well as the difference between the distances $B_2$ and $B_3$ is infinitesimal relative to the distance B. The distance B between the lens 11 and the focal point Q, it should be noted, varies depending on the distance A between the target object 1 and the lens 11.

On the image pickup plane 12-1a of the CCD 12-1, an image considerably out of focus is formed. This image has a circle of confusion with a radius $R_1$. The image is equivalent to a sharply-focused image (an image picked up on the plane at the distance B from the lens 11) being subjected to a box filter with the radius $R_1$.

The box filter with the radius R signifies a filter that provides $1/(\pi R^2)$ within the radius R from the origin of the circle and gives 0 in other regions.

On the image pickup plane 12-2a of the CCD 12-2 is formed an image that is less out of focus than the image picked up on the plane 12-1a of the CCD 12-1, but out of focus nonetheless. This image has a circle of confusion with a radius $R_2$. The image is equivalent to a sharply-focused image (an image picked up on the plane at the distance B from the lens 11) being subjected to a box filter with the radius $R_2$.

On the image pickup plane 12-3a of the CCD 12-3 is formed an image that is less out of focus than the image picked up on the plane 12-2a of the CCD 12-2, but still out of focus. This image has a circle of confusion with a radius $R_3$. The image is equivalent to a sharply-focused image (an image picked up on the plane at the distance B from the lens 11) being subjected to a box filter with the radius $R_3$.

As described, the image pickup device 2 picks up three images with circles of confusion having the radii $R_1$, $R_2$ and $R_3$, and outputs these images to the image processing apparatus 3.

Since the difference between the distances $B_1$ and $B_2$ is arranged to be infinitesimal as with the difference between the distances $B_2$ and $B_3$, the radii $R_1$ and $R_2$ are regarded as approximately equal, and so are the radii $R_2$ and $R_3$. As shown in FIG. 2, there exists the relationship that $R_1>R_2>R_3$.

Figure 3:
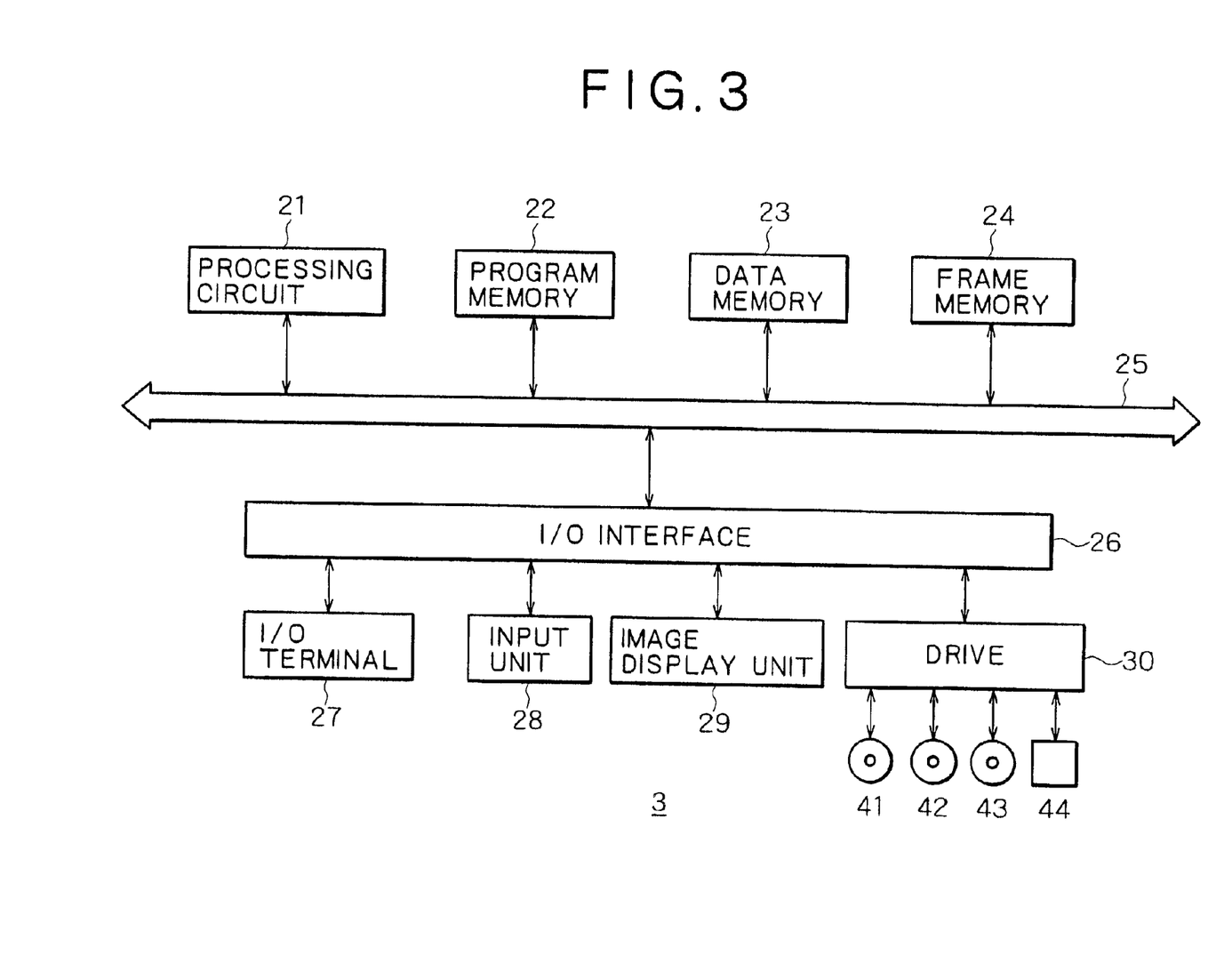
FIG. 3 is a block diagram depicting hardware typical of an image processing apparatus included in FIG. 1.

FIG. 3 is a block diagram depicting a typical electrical hardware structure of the image processing apparatus 3. Referring to FIG. 3, a processing circuit 21 reads processing programs from a program memory 22 over a bus 25 and executes the programs for processing, as will be described later. The program memory 22 accommodates the programs to be carried out by the processing circuit 21 as well as data that are needed by the circuit 21 during its operation. A data memory 23 stores image data prior to processing and processed data (i.e., focused-image data) derived from processing by the processing circuit 21. A frame memory 24 temporarily holds the processed data on their way from the data memory 23 to an image display unit 29. The processing circuit 21, program memory 22, data memory 23, and frame memory 24 are interconnected via the bus 25, and also connected to an I/O interface 26.

The I/O interface 26 is further connected to an I/O terminal 27 and an input unit 28 in addition to the image display unit 29. The I/O terminal 27 admits image data constituting a plurality of images picked up by the image pickup device 2, and allows processed data to be output to an external device. The input unit 28 is illustratively made up of a keyboard and a mouse, and the image display unit 29 is composed of an LCD (liquid crystal display), a CRT (cathode ray tube) or like equipment. The I/O interface 26 is connected as needed with a drive 30 that allows programs to be installed. The drive 30 may accommodate a magnetic disc 41, an optical disc 42, a magneto-optical disc 43, or a semiconductor memory 44.

Prior to a description of the workings of the preferred embodiment, the images (represented herein as G(x, y)) supplied from the image pickup device 2 to the image processing apparatus 3 will be explained in detail below.

First, consider an averaging computation to be performed on images G(x, y) by use of the following expression (1):

$$H(x, y, T) = \frac{1}{2\pi} \int_0^{2\pi} G(x + T\cos(\theta), y + T\sin(\theta)) d\theta \quad (1)$$

where, H(x, y, T) denotes an average of the images G(x, y) in all locations at a distance T from a location (x, y), and θ represents an angle variable. In expression (1) above, values of the images G(x, y) shifted by (T cos(θ), T sin(θ)) each from the location (x, y) are integrated from 0 to 2π with respect to θ. The result from the integration is divided by 2π to yield an average of the images G(x, y). The average of the images G(x, y) will thus be denoted as the image H(x, y, T) hereunder.

Suppose now that images G(x, y) are out of focus by a radius R each with respect to a sharply-focused image F(x, y), i.e., that the images G(x, y) have a circle of confusion with the radius R each. Each image having the circle of confusion with the radius R will be referred to as the image G(x, y, R) in the description that follows.

As mentioned above, the image G(x, y, R) having the circle of confusion with the radius R is equivalent to a sharply-focused image F(x, y) being subjected to a box filter with the radius R. In that case, the image G(x, y, R) is given by expression (2):

$$G(x, y, R) = \frac{1}{\pi R^2} \int\int_{S(R)} F(x + u, y + v) du dv \quad (2)$$

where, S(R) denotes the inside of a circle with the radius R. That is, in expression (2) above, the value of a focused image F(x, y) being out of focus by (u, v) is doubly integrated inside the circle (S(R)) having the radius R. The result from the double integration is divided by $\pi R^2$ to yield the value of the image G(x, y, R).

The average of the image G(x, y, R) having the circle of confusion with the radius R is computed by substituting expression (2) for expression (1) above. The average is thus given by expression (3):

$$H(x, y, T, R) = \quad (3)$$

$$\frac{1}{2\pi^2 R^2} \int_0^{2\pi} d\theta \int\int_{S(R)} dudv F(x + T\cos(\theta) + u, y + T\sin(\theta) + v)$$

where, H(x, y, T, R) denotes the average of the images G(x, y, R) each having the circle of confusion with the radius R in all locations at the distance T from the location (x, y), and θ represents an angle variable. The average of the images G(x, y, R) each having the circle of confusion with the radius R will thus be denoted as the image H(x, y, T, R) hereunder.

As described, performing the computation of expression (1) on the images G(x, y, R) having the circle of confusion with the radius R each provides a new image H(x, y, T, R). This new image coincides with the image H(x, y, T, R) acquired by carrying out the computation of expression (3) on the sharply-focused image F(x, y).

Now consider the degree of contributions made by values of points in the sharply-focused image F(x, y) to the values of the image H(x, y, T, R) computed by use of expression (3) above. In other words, consider calculating data $H_C$(x, y, x+p, y+q, T, R) indicating how much the values of the image F(x, y) in a location (x+p, y+q) contribute to the values of the image H(x, y, T, R) in the location (x, y).

The data $H_C$(x, y, x+p, y+q, T, R) is obtained by computations with expression (3) on the assumption that the result of the computations on the sharply-focused image F(x, y) is 1 in the location (x+p, y+q) and 0 elsewhere. That is, the data $H_C$(x, y, x+p, y+q, T, R) is given by expression (4) based on a delta function:

$$H_C(x, y, x + p, y + q, T, R) = \quad (4)$$

$$\frac{1}{2\pi^2 R^2} \int_0^{2\pi} d\theta \int\int_{s(R)} dudv \delta((x + T\cos(\theta) + u) - (x + p),$$

$$(y + T\sin(\theta) + v) - (y + q)$$

where, the double integral of (u, v) yields 1 if the point with an X coordinate of x+T cos(θ)−(x+p) and a Y coordinate of y+T sin(θ)−(y+q) exists within the radius R and provides 0 if the point is not found therein. In other words, the result of the double integral is 1 if the point (x+p, y+q) exists within the radius R around the point (x+T cos(θ), y+T sin(θ)) and is 0 if the point does not exist within the specified radius R.

Figure 4:
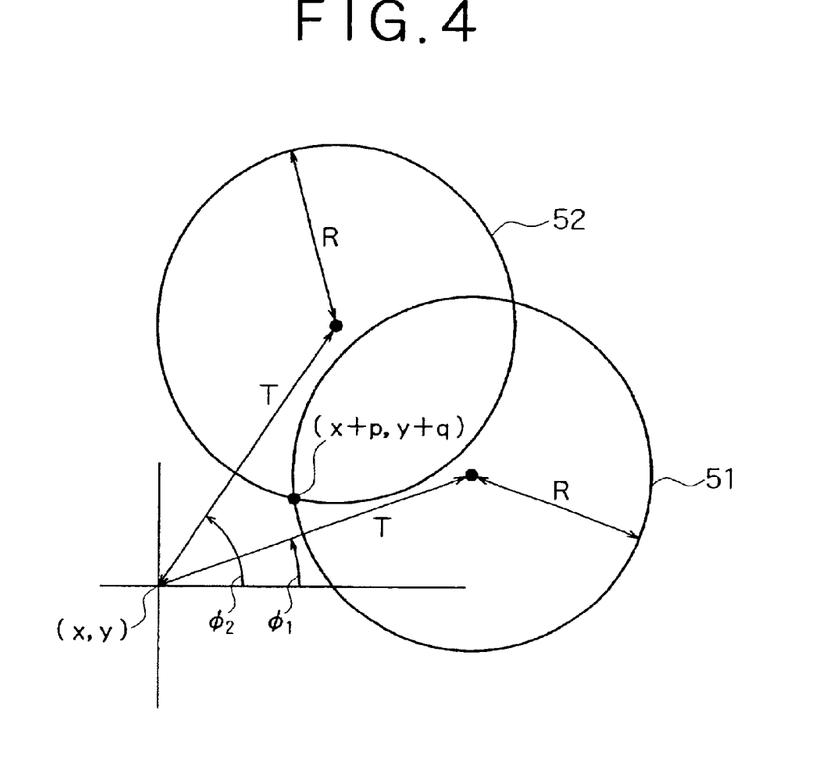
FIG. 4 is a schematic view indicating regions in which a double integral of (u, v) with expression (4) yields 1.

FIG. 4 schematically shows regions in which the double integral of (u, v) with expression (4) yields 1. In FIG. 4, the horizontal axis is regarded as the X-axis and the vertical axis as the Y-axis (the same applies as well to other figures subsequent to FIG. 4). Referring to FIG. 4, regions 51 and 52 are each a circle with the radius R. The center of each circle is at a distance T from a point (x, y). A point (x+p, y+q) exists on the circumference of each circle. A line segment from the point (x, y) to the center of the region 51 has an angle of $\phi_1$ with respect to the X-axis; a line segment from the point (x, y) to the center of the region 52 has an angle of $\phi_2$ relative to the X-axis. The distance T is assumed to be greater than the radius R (T>R).

Figure 5:
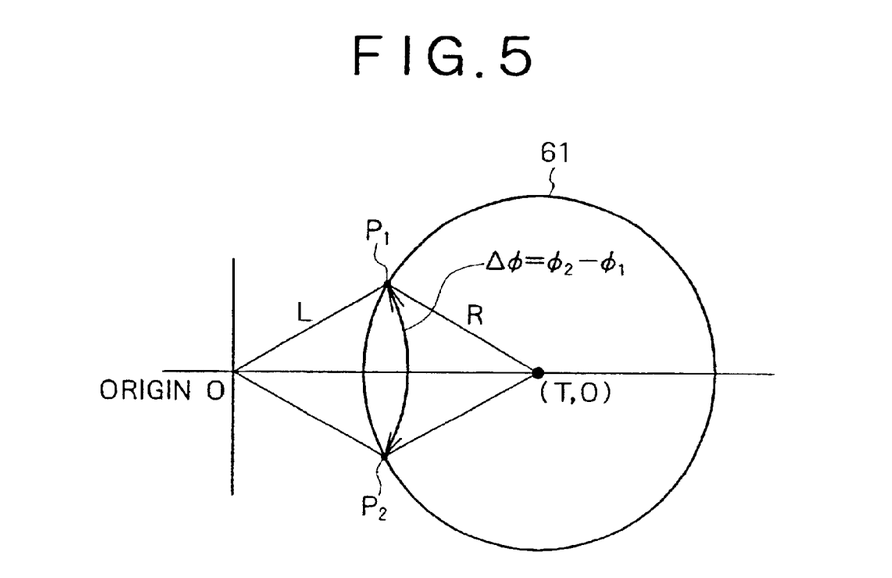
FIG. 5 is a schematic view showing a region to which values computed by use of expression (5) apply.

Suppose that there is an angle θ between the angles $\phi_1$ and $\phi_2$ defined above. In that case, the point (x+p, y+q) exists within the radius R around the point (x+T cos(θ), y+T sin(θ)). This means that expression (4) above may be transformed into expression (5) below:

$$H_C(x, y, x + p, y + q, T, R) = \quad (5)$$

$$\frac{1}{2\pi^2 R^2} \int_{\phi_1}^{\phi_2} 1 d\theta = \frac{1}{2\pi^2 R^2}(\phi_2 - \phi_1) = \frac{\Delta\phi}{2\pi^2 R^2}$$

where, Δϕ represents $\phi_2 - \phi_1$ (shown in FIG. 4). FIG. 5 schematically shows a region to which the data $H_C$(x, y, x+p, y+q, T, R) computed by use of expression (5) applies.

In FIG. 5, a region 61 is a circle with the radius R. The center (T, 0) of the circle is at a distance T from the origin O. Points $P_1$ and $P_2$ exist on the circumference, each point at a distance L from the origin O. The distance L represents the distance between the points (x, y) and (x+p, y+q) shown in FIG. 4 and is expressed as L=√($p^2+q^2$). Reference character Δϕ denotes the angle between the points $P_1$ and $P_2$ on a circular arc with respect to the origin O. The distance L is subject to the relation of (T−R)≦L≦(T+R).

If the distance T is greater than the radius R and if the distance L between the points (x, y) and (x+p, y+q) is subject to the relation of (T−R)≦L≦(T+R) as described, then it is possible to compute the data $H_C$(x, y, x+p, y+q, T, R) in expression (4) above. Where the distance T is less than the radius R, it is also possible to compute likewise the data $H_C$(x, y, x+p, y+q, T, R) in expression (4).

Figure 6:
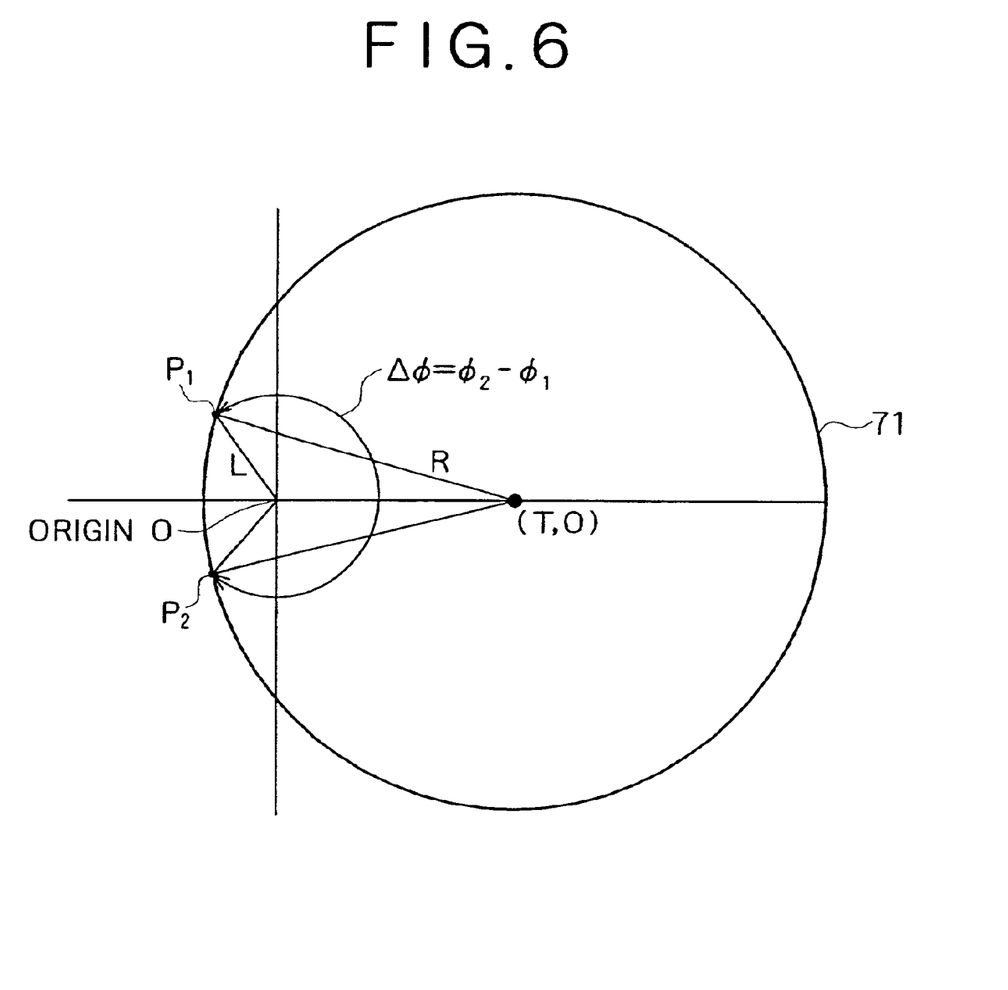
FIG. 6 is a schematic view depicting a region to which values computed by use of expression (4) apply.

FIG. 6 schematically depicts a region to which the data $H_C$(x, y, x+p, y+q, T, R) computed with expression (4) applies when the distance T is less than the radius R and when the distance L between the points (x, y) and (x+p, y+q) is subject to the relation of (R−T)≦L≦(T+R).

In FIG. 6, a region 71 is a circle with the radius R. The center (T, 0) of the circle is at a distance T from the origin O. Points P1 and P2 exist on the circumference, each point at a distance L from the origin O. The distance L represents the distance between the points (x, y) and (x+p, y+q) shown in FIG. 4 and is expressed as L=√($p^2+q^2$) Reference character Δϕ denotes the angle between the points $P_1$ and $P_2$ on a circular arc with respect to the origin O.

Figure 7:
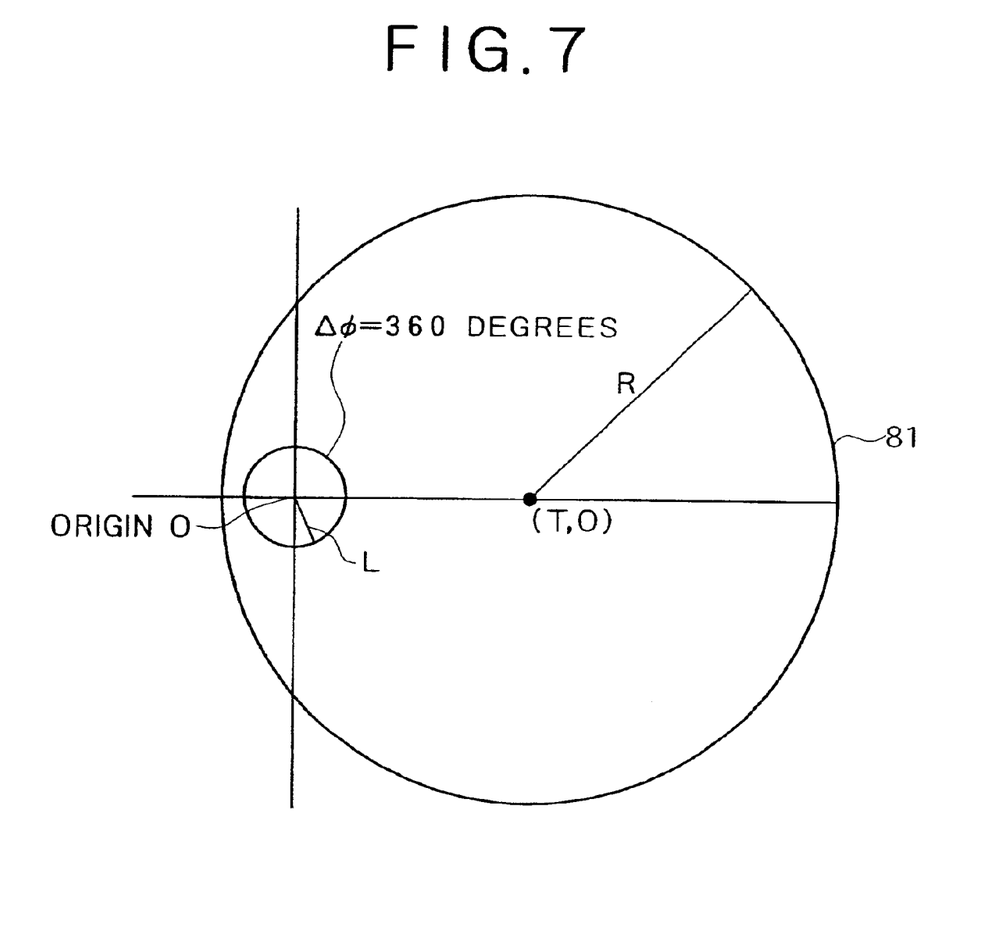
FIG. 7 is a schematic view illustrating another region to which values computed by use of expression (4) apply.

FIG. 7 schematically illustrates another region to which the data $H_C$(x, y, x+p, y+q, T, R) computed with expression (4) applies when the distance T is less than the radius R and when the distance L between the points (x, y) and (x+p, y+q) is subject to the relation of L<(R−T).

In FIG. 7, a region 81 is a circle with the radius R. The center (T, 0) of the circle is at a distance T from the origin O. In this case, the angle Δϕ is 360 degrees because a point (p, q) exists within the radius R around a point (T cos(θ), T sin(θ)) at all angles θ (i.e., 0 through 360 degrees).

As can be seen in FIGS. 5 through 7, the data $H_C$(x, y, x+p, y+q, T, R) in expression (4) above is related not directly to values x, y, p and q but to the distance L between the points (x, y) and (x+p, y+q). For purpose of simplification, the data $H_C$(x, y, x+p, y+q, T, R) will be referred to as the data $H_C$(L, T, R) in the description that follows.

Consider the fact that the point (p, q) does not exist within the radius R around the point (T cos(θ), T sin(θ)) at all angles θ (0 through 360 degrees) if T>R and L<(T−R) or if T>R and (T+R)<L. Given that fact, expression (4) above may be replaced by expression (6) below:

$$H_C(L, T, R) = \qquad (6)$$

$$\frac{\Delta\phi}{2\pi^2 R^2} = \begin{cases} \frac{360}{2\pi^2 R^2} \text{ degrees } (0 \le L \le (R-T)) \\ \frac{2}{\pi^2 R^2} \cos^{-1}\left\{\sqrt{M \cdot (M-R)/L/T}\right\} (|T-R| < L < T+R) \\ 0 \text{ degree (elsewhere)} \end{cases}$$

The value M in expression (6) above is provided by expression (7):

$$M = (L+R+T)/2 \qquad (7)$$

As described, the new image H(x, y, T, R) can be obtained by performing computations of expression (1) on the images G(x, y, R) having the circle of confusion with the radius R each. This new image coincides with the image H(x, y, T, R) acquired by carrying out the computation of expression (3) on the sharply-focused image F(x, y).

The value of the image H(x, y, T, R) in a given location (x, y) is acquired by weighting and adding up (i.e., integrating) the values of the images F(x, y) in locations (x+p, y+q) as shown in expression (3) above. The weight (i.e., contribution ratio) used here is a function of $L=\sqrt{(p^2+q^2)}$. The value of the function is equivalent to the data $H_C(L, T, R)$ in expression (6) above.

Now consider three out-of-focus images with different degrees of defocusing with regard to a sharply-focused image F(x, y). The degrees of defocusing of the three images are represented by $R_1$, $R_2$ and $R_3$ ($R_1 > R_2 > R_3$; expressed by radii of their circles of confusion). The three images are thus defined as $G_1(x, y, R_1)$, $G_2(x, y, R_2)$ and $G_3(x, y, R_3)$. Computations with expression (3) are carried out on these images $G_1(x, y, R_1)$, $G_2(x, y, R_2)$ and $G_3(x, y, R_3)$. It is assumed that $T=R_2$ for the image $G_1(x, y, R_1)$, that $T=R_1$ for the image $G_2(x,y, R_2)$ and that $T=R_1+R_2-R_3$ for the image $G_3(x,y, R_3)$.

Performing the computations with expression (3) provides an image H(x, y, $R_2$, $R_1$) as an average of the image $G_1(x, y, R_1)$, an image H(x, y, $R_1$, $R_2$) as an average of the image $G_2(x, y, R_2)$ and an image H(x, y, $R_1+R_2-R_3$, $R_3$) as an average of the image $G_3(x, y, R_3)$. These three images are subjected to computations with expression (8) below for a weighted average using weights $W_1$, $W_2$ and $W_3$:

$$H_3(x,y,R_1,R_2,R_3,W_1,W_2,W_3) = W_1 \cdot H(x,y,R_2,R_1) + W_2 \cdot H(x,y,R_1,R_2) + W_3 \cdot H(x,y,R_1+R_2-R_3,R_3) \qquad (8)$$

where, $H_3$(x, y, $R_1$, $R_2$, $R_3$, $W_1$, $W_2$, $W_3$) denotes a weighted average of the three images H(x, y, $R_2$, $R_1$), H(x, y, $R_1$, $R_2$) and H(x, y, $R_1+R_2-R_3$, $R_3$). This weighted average will be abbreviated as the image $H_3$ hereunder. As described, the value of the image $H_3$ in a given location (x, y) is obtained by weighting and adding up (i.e., integrating) the values of the images F(x, y) in locations (x+p, y+q). The weight used here (i.e., contribution rate) is given by expression (9) below:

$$H_{3C}(L,R_1,R_2,R_3,W_1,W_2,W_3) = W_1 \cdot H_C(L,R_2,R_1) + W_2 \cdot H_C(L,R_1,R_2) + W_3 \cdot H_C(L,R_1+R_2-R_3,R_3) \qquad (9)$$

where, $H_{3C}$(L, $R_1$, $R_2$, $R_3$, $W_1$, $W_2$, $W_3$) denotes the weight of the image $H_3$. This weight will be referred to as the weight $H_{3C}$ in the description that follows. Reference character L represents the distance between the points (x, y) and (x+p, y+q) shown in FIG. 4 and is expressed as $L=\sqrt{(p^2+q^2)}$.

Figure 8:
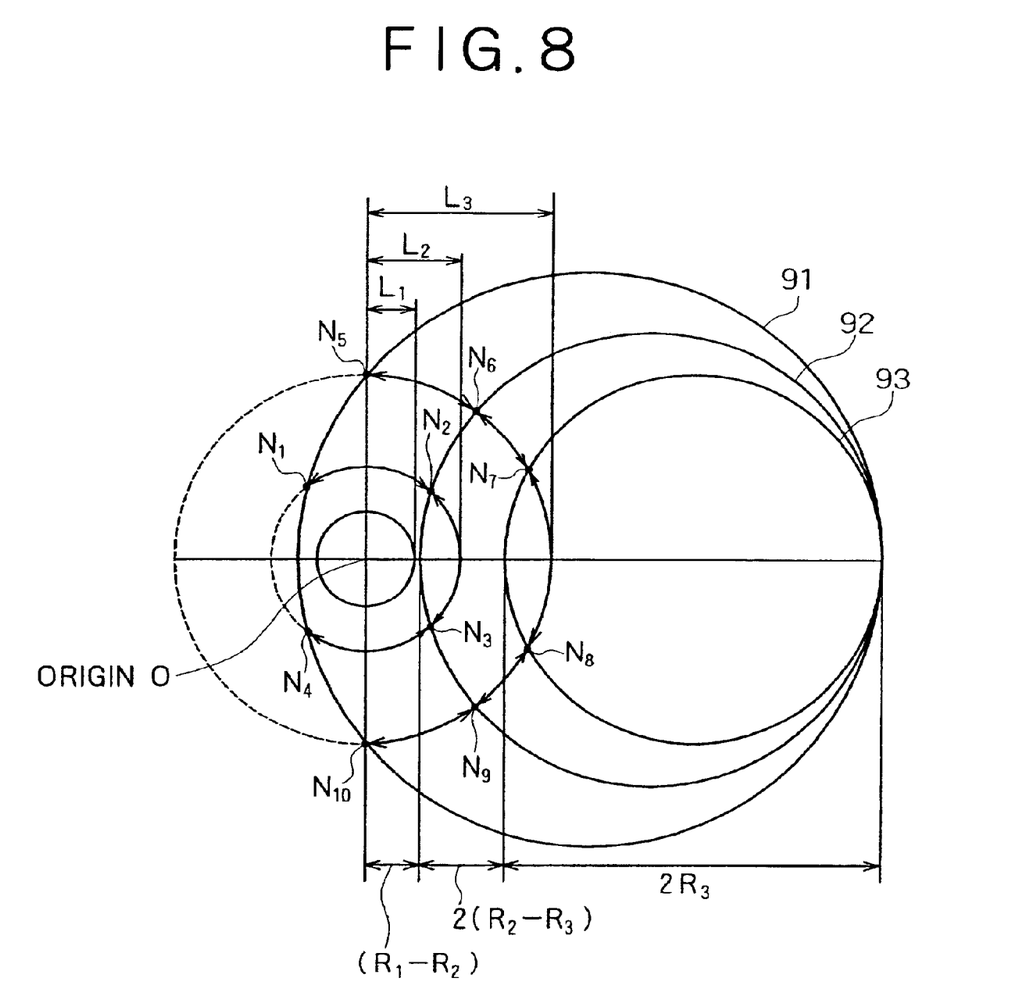
FIG. 8 is a schematic view indicating regions to which values computed by use of expression (9) apply.

FIG. 8 schematically indicates regions to which the weight $H_{3C}$ computed by use of expression (9) applies. In FIG. 8, regions 91 through 93 are circles with radii $R_1$, $R_2$ and $R_3$ around centers ($R_2$, 0), ($R_1$, 0) and ($R_1+R_2-R_3$, 0) respectively. Consider now a distance $L_1$ in FIG. 8 where the distance L is less than ($R_1-R_2$).

In the case above, the first term $W_1 \cdot H_C(L, R_2, R_1)$ on the right-hand side in expression (9) above corresponds to the region of $0 \le L \le (R-T)$ in expression (6), as explained with reference to FIG. 7. Thus the term is expressed as $$W_1 \cdot H_C(L, R_2, R_1) = W_1 \cdot (360/2(\pi R_1)^2)$$

The second term $W_2 \cdot H_C(L, R_1, R_2)$ and the third term $W_3 \cdot H_C(L, R_1+R_2-R_3, R_3)$ on the right-hand side in expression (9) are both zero.

Consider now a distance $L_2$ in FIG. 8 where the distance L is subject to the relation of $(R_1-R_2) \le L \le (R_1+R_2)-(2 \cdot R_3)$. It is assumed that the angle of a circular arc formed by points $N_1, N_2, N_3$ and $N_4$ with respect to the origin O is represented by $\angle N_1 N_2 N_3 N_4$ and that the angle of a circular arc formed by the points $N_2$ and $N_3$ relative to the origin O is denoted by $\angle N_2 N_3$.

In the case above, the first term $W_1 \cdot H_C(L, R_2, R_1)$ on the right-hand side in expression (9) is expressed as $$W_1 \cdot H_C(L, R_2, R_1) = W_1 \cdot (\angle N_1 N_2 N_3 N_4 / 2(\pi R_1)^2)$$

The second term $W_2 \cdot H_C(L, R_1, R_2)$ on the right-hand side in expression (9) is expressed as $$W_2 \cdot H_C(L, R_1, R_2) = W_2 \cdot (\angle N_2 N_3 / 2(\pi R_2)^2)$$

The third term $W_3 \cdot H_C(L, R_1+R_2-R_3, R_3)$ on the right-hand side in expression (9) is zero.

Consider a distance L3 in FIG. 8 where the distance L is subject to the relation of $(R_1+R_2-R_3) \le L < (R_1+R_2)$. It is assumed that the angle of a circular arc formed by points $N_5$, $N_6$, $N_7$, $N_8$, $N_9$ and $N_{10}$ with respect to the origin O is represented by $\angle N_5 N_6 N_7 N_8 N_9 N_{10}$ that the angle of a circular arc formed by the points $N_6$, $N_7$, $N_8$ and $N_9$ relative to the origin O is denoted by $\angle N_6 N_7 N_8 N_9$ and that the angle of a circular arc formed by the points $N_7$ and $N_8$ with regard to the origin O is represented by $\angle N_7 N_8$.

In the case above, the first term $W_1 \cdot H_C(L, R_2, R_1)$ on the right-hand side in expression (9) is expressed as $$W_1 \cdot H_C(L, R_2, R_1) = W_1 \cdot (\angle N_5 N_6 N_7 N_8 N_9 N_{10} / 2(\pi R_1)^2)$$

The second term $W_2 \cdot H_C(L, R_1, R_2)$ on the right-hand side in expression (9) is expressed as $$W_2 \cdot H_C(L, R_1, R_2) = W_2 \cdot (\angle N_6 N_7 N_8 N_9 / 2\pi R_2)^2)$$

The third term $W_3 \cdot H_C(L, R_1+R_2-R_3, R_3)$ on the right-hand side in expression (9) is expressed as $$W_3 \cdot H_C(L, R_1+R_2-R_3, R_3) = W_3 \cdot (\angle N_7 N_8 / 2(\pi R_3)^2)$$

If the distance L is subject to the relation of $(R_1+R_2) \le L$, then all terms on the right-hand side in expression (9) are zero.

As shown in FIG. 8, if illustratively $W_1=(\pi R_1)^2$, $W_2=-2 \cdot (\pi R_2)^2$ and $W_3=(\pi R_3)^2$ and if $L=L_1$, then the value of the weight $H_{3C}$ is expressed as $$H_{3C} = 360/2 = 180$$

If $L=L_2$, the value of the weight $H_{3C}$ is expressed as $$H_{3C} = (\angle N_1 N_2 N_3 N_4 / 2) - 2 \cdot (\angle N_2 N_3 / 2)$$

This value is approximately zero as can be seen from FIG. 8. If $L=L_3$, the value of the weight $H_{3C}$ is expressed as $$H_{3C}=(\angle N_5N_6N_7N_8N_9N_{10}/2)-2\cdot(\angle N_6N_7N_8N_9/2)+(\angle N_7N_8/2)$$

This value is virtually zero as can be seen from FIG. 8.

With the weights $W_1$, $W_2$ and $W_3$ established as described, the weight $H_{3C}$ of the three images becomes extremely close to zero if the distance L is equal to or greater than $(R_1-R_2)$, unlike in the case where the distance L is less than $(R_1-R_2)$. It can thus be understood that only the value of the sharply-focused image F(x, y) near the location (x, y) contributes to the value of the image $H_3$ in the location (x, y).

Consider now two out-of-focus images with different degrees of defocusing with regard to a sharply-focused image F(x, y). The degrees of defocusing of the two images are represented by $R_1$ and $R_2$ ($R_1>R_2$; expressed by radii of their circles of confusion). The two images are thus defined as $G_1(x, y, R_1)$ and $G_2(x, y, R_2)$. Computations with expression (3) are carried out on these images $G_1(x, y, R_1)$ and $G_2(x, y, R_2)$. It is assumed that $T=R_2$ for the image $G_1(x, y, R_1)$ and $T=R_1$ for the image $G_2(x, y, R_2)$.

Performing the computations with expression (3) provides an image $H(x, y, R_2, R_1)$ as an average of the image $G_1(x, y, R_1)$ and an image $H(x, y, R_1, R_2)$ as an average of the image $G_2(x, y, R_2)$. These two images are subjected to computations with expression (10) below for a weighted average using weights $W_1$ and $W_2$:

$$H_2(x,y,R_1,R_2,W_1,W_2)=W_1\cdot H(x,y,R_2,R_1)+W_2\cdot H(x,y,R_1,R_2) \quad (10)$$

where, $H_2(x, y, R_1, R_2, W_1, W_2)$ denotes a weighted average of the two images $H(x, y, R_2, R_1)$ and $H(x, y, R_1, R_2)$. This weighted average will be abbreviated as the image $H_2$ hereunder. As described, the value of the image $H_2$ in a given location (x, y) is obtained by weighting and adding up (i.e., integrating) the values of the images F(x, y) in locations (x+p, y+q). The weight used here (i.e., contribution rate) is given by expression (11) below:

$$H_{2C}(L,R_1,R_2,W_1,W_2)=W_1\cdot H_C(L,R_2,R_1)+W_2\cdot H_C(L,R_1,R_2) \quad (11)$$

where, $H_{2C}(L, R_1, R_2, W_1, W_2)$ denotes the weight of the image $H_2$. This weight will be referred to as the weight $H_{2C}$ in the description that follows. Reference character L represents the distance between the points (x, y) and (x+p, y+q) shown in FIG. 4 and is expressed as $L=\sqrt{(p^2+q^2)}$.

Figure 9:
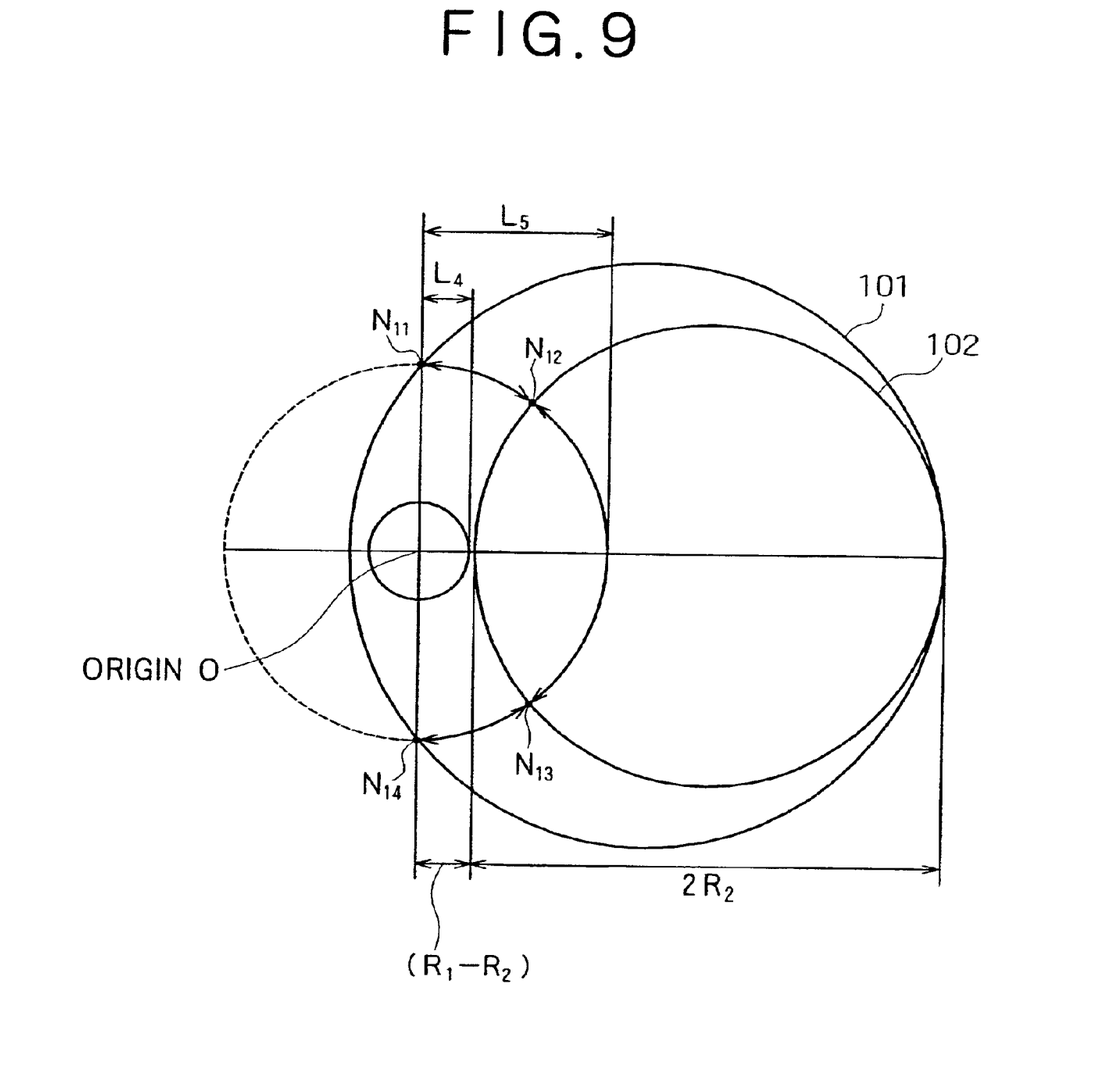
FIG. 9 is a schematic view showing regions to which values computed by use of expression (11) apply.

FIG. 9 schematically depicts regions to which the weight $H_{2C}$ computed by use of expression (11) applies. In FIG. 9, regions 101 through 102 are circles with radii $R_1$ and $R_2$ around centers ($R_2$, 0) and ($R_1$, 0) respectively. Consider now a distance $L_4$ in FIG. 9 where the distance L is less than $(R_1-R_2)$.

In the case above, the first term $W_1\cdot H_C(L, R_2, R_1)$ on the right-hand side in expression (11) above corresponds to the region of $0\leq L\leq(R-T)$ in expression (6), as explained with reference to FIG. 7. Thus the term is expressed as $$W_1\cdot H_C(L,R_2,R_1)=W_1\cdot(360/2(\pi R_1)^2)$$

The second term $W_2\cdot H_C(L, R_1, R_2)$ on the right-hand side in expression (11) is zero.

Consider now a distance $L_5$ in FIG. 9 where the distance L is subject to the relation of $(R_1-R_2)\leq L<(R_1+R_2)$. It is assumed that the angle of a circular arc formed by points $N_{11}$, $N_{12}$, $N_{13}$ and $N_{14}$ with respect to the origin O is represented by $\angle N_{11}N_{12}N_{13}N_{14}$ and that the angle of a circular arc formed by the points $N_{12}$ and $N_{13}$ relative to the origin O is denoted by $\angle N_{12}N_{13}$.

In the case above, the first term $W_1\cdot H_C(L, R_2, R_1)$ on the right-hand side in expression (11) is expressed as $$W_1\cdot H_C(L,R_2,R_1)=W_1\cdot(\angle N_{11}N_{12}N_{13}N_{14}/2(\pi R_1)^2)$$

The second term $W_2\cdot H_C(L, R_1, R_2)$ on the right-hand side in expression (11) is expressed as $$W_2\cdot H_C(L,R_1,R_2)=W_2\cdot(\angle N_{12}N_{13}/2(\pi R_2)^2)$$

If the distance L is subject to the relation of $(R_1+R_2)\leq L$, then all terms on the right-hand side in expression (11) are zero.

As shown in FIG. 9, if illustratively $W_1=(\pi R_1)^2$ and $W_2=-C\cdot(\pi R_2)^2$ and if $L=L_4$, then the value of the weight $H_{2C}$ is expressed as $$H_{2C}=360/2=180$$

where, C stands for a value of about 1.2. If $L=L_5$, then the value of the weight $H_{2C}$ is expressed as $$H_{2C}=(\angle N_{11}N_{12}N_{13}N_{14}/2)-C\cdot(\angle N_{12}N_{13}/2)$$

This value is virtually zero as can be seen from FIG. 9.

With the weights $W_1$ and $W_2$ established as described, the weight $H_{2C}$ of the two images becomes extremely close to zero if the distance L is equal to or greater than $(R_1-R_2)$, unlike in the case where the distance L is less than $(R_1-R_2)$. It can thus be understood that only the value of the sharply-focused image F(x, y) near the location (x, y) contributes to the value of the image $H_2$ in the location (x, y).

An image touch-up process performed by the image processing apparatus 3 will now be described with reference to the flowchart of FIG. 10. The process involves creating a sharply-focused image by touching up three out-of-focus images with different degrees of defocusing.

Figure 10:
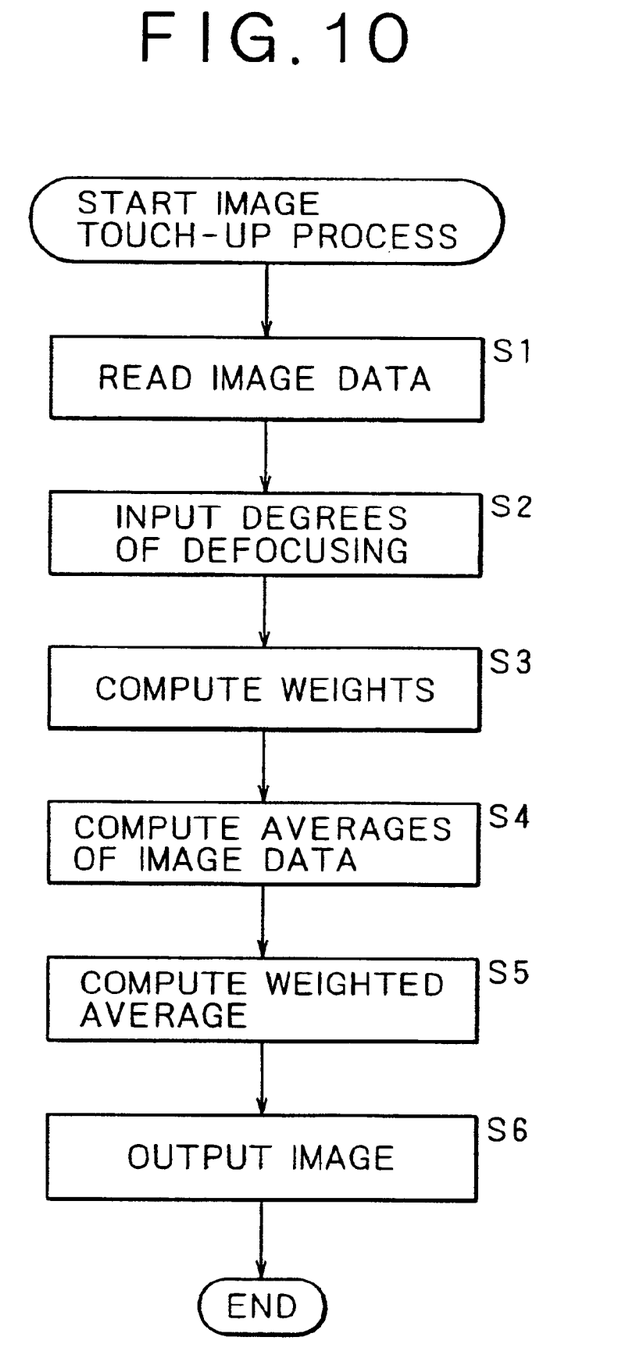
FIG. 10 is a flowchart of steps constituting an image touch-up process.

In step S1 of FIG. 10, the processing circuit 21 reads from the image pickup device 2 image data representing a plurality of images (3 images in this example) to be touched up (i.e., to be brought into focus). The image data are held temporarily in the data memory 23 following input through the I/O terminal 27, I/O interface 26 and bus 25. Three images $G_1(x, y)$, $G_2(x, y)$ and $G_3(x, y)$ are now placed in the data memory 23.

In step S2, the input unit 28 is used to input degrees of defocusing (i.e., radii of circles of confusion) with respect to the data representative of the three images read in step S1. Specifically, a user operates the input unit 28 to enter different degrees of defocusing regarding the three images. This establishes three images $G_1(x, y, R_1)$, $G_2(x, y, R_2)$ and $G_3(x, y, R_3)$.

In step S3, the processing circuit 21 reads the data of the three images from the data memory 23 to compute weights $W_1$, $W_2$ and $W_3$. The weights $W_1$, $W_2$ and $W_3$ are computed by the processing circuit 21 in such a manner that the weight $H_{3C}$ shown in expression (9) is minimized on condition that $L>(R_1-R_2)$. The processing circuit 21 stores the computed weights $W_1$, $W_2$ and $W_3$ into the data memory 23.

In step S4, the processing circuit 21 computes an average of each of the three images whose data are held in the data memory 23. Specifically, the processing circuit 21 computes averages of the images $G_1(x, y, R_1)$, $G_2(x, y, R_2)$ and $G_3(x, y, R_3)$ using expressions (12), (13) and (14) respectively:

$$h_1(x, y) = \frac{1}{2\pi}\int_0^{2\pi} G_1(x + R_2\cos(\theta), y + R_2\sin(\theta))d\theta \qquad (12)$$

$$h_2(x, y) = \frac{1}{2\pi}\int_0^{2\pi} G_2(x + R_1\cos(\theta), y + R_1\sin(\theta))d\theta \qquad (13)$$

$$h_3(x, y) = \frac{1}{2\pi}\int_0^{2\pi} G_3(x + (R_1 + R_2 - R_3)\cdot\cos(\theta), y + (R_1 + R_2 - R_3)\cdot\sin(\theta))d\theta \qquad (14)$$

With expression (12), values of the image $G_1(x, y, R_1)$ shifted by $(R_2 \cos(\theta), R_2 \sin(\theta))$ from the location $(x, y)$ are integrated from 0 to $2\pi$ with respect to $\theta$. The result from the integration is divided by $2\pi$ to give the average of the image $G_1(x, y, R_1)$. With expression (13), values of the image $G_2(x, y, R_2)$ shifted by $(R_1 \cos(\theta), R_1 \sin(\theta))$ from the location $(x, y)$ are integrated from 0 to $2\pi$ with respect to $\theta$. The result from the integration is divided by $2\pi$ to give the average of the image $G_2(x, y, R_2)$. With expression (14), values of the image $G_3(x, y, R_3)$ shifted by $((R_1+R_2-R_3)\cos(\theta), (R_1+R_2-R_3)\sin(\theta))$ from the location $(x, y)$ are integrated from 0 to $2\pi$ with respect to $\theta$. The result from the integration is divided by $2\pi$ to give the average of the image $G_3(x, y, R_3)$.

In step S5, the processing circuit 21 performs computations with expression (15) below on the averages of the three-image data computed in step S4, i.e., on images $h_1(x, y)$, $h_2(x, y)$ and $h_3(x, y)$ to acquire a weighted average using the weights $W_1$, $W_2$ and $W_3$ calculated in step S3:

$$H_3(x,y)=W_1\cdot h_1(x,y)+W_2\cdot h_2(x,y)+W_3\cdot h_3(x,y) \qquad (15)$$

With expression (15), the images $h_1(x, y)$, $h_2(x, y)$ and $h_3(x, y)$ are weighted by $W_1$, $W_2$ and $W_3$ respectively before being added up to provide an image $H_3$.

In step S5, the processing circuit 21 stores the computed image $H_3$ into the data memory 23.

In step S6, the processing circuit 21 reads the image $H_3$ that was computed and placed into the data memory 23 in step S5, and places the retrieved image temporarily into the frame memory 24. From the frame memory 24, the processing circuit 21 outputs the image to the image display unit 29 through the bus 25 and I/O interface 26. This terminates the image touch-up process.

As described, a sharply-focused image is obtained by subjecting three out-of-focus images with different degrees of defocusing (i.e., radii of different circles of confusion) to weighted averaging.

In the process discussed above, the radii $R_1$, $R_2$ and $R_3$ were assumed to be known so that the user could make their entries from the input unit 28. Generally, however, these values are unknown. In such cases, the radii $R_1$, $R_2$ and $R_3$ may be suitably varied in values when subjected repeatedly to the process above until an optimum image $H_3$ is obtained.

To obtain the optimum image $H_3$ at this point requires performing one of two proceedings: either the user checks to see if an image on the image display unit 29 is optimum (i.e., visually checks the image if it is focused); or the displayed image is automatically checked for any high-frequency components. The latter check takes advantage of the fact that out-of-focus images contain no high-frequency components.

Meanwhile, as shown in FIG. 2, the radii $R_1$, $R_2$ and $R_3$ are subject to the relation defined by expression (16):

$$R_1:R_2:R_3:(D/2)=(B-B_1):(B-B_2):(B-B_3):B \qquad (16)$$

where, B stands for an indefinite value. In that case, only those radii $R_1$, $R_2$ and $R_3$ which satisfy the relation defined by expression (16) may be allowed to undergo the image touch-up process.

If the distance A between the target object 1 and the lens 11 is known, the distance B may be computed by use of expression (17):

$$(1/A)+(1/B)=(1/Z) \qquad (17)$$

The radii $R_1$, $R_2$ and $R_3$ are thus computed (i.e., established) by expressions (16) and (17) above.

The ratio of the radii $R_1$, $R_2$ and $R_3$ may be computed by analyzing the images $G_1(x, y)$, $G_2(x, y)$ and $G_3(x, y)$. As explained earlier, the images $G_1(x, y)$, $G_2(x, y)$ and $G_3(x, y)$ are images that have undergone filtering by box filters with radii $R_1$, $R_2$ and $R_3$. Illustratively, when an image G is subject to a box filter with a radius R, the component of a frequency $\omega$ is defined by expression (18):

$$2\cdot R\cdot\sin c(\omega R/\pi)=2\cdot R\cdot\sin(\omega R)/\omega R \qquad (18)$$

Hence the following computations: the images $G_1(x, y)$, $G_2(x, y)$ and $G_3(x, y)$ are subjected to frequency division to calculate the component $\omega$ of each of their frequencies. Then the ratio of the radii $R_1$, $R_2$ and $R_3$ need only be determined in such a manner that the ratio of the components at the respective frequencies satisfies expression (19) below:

$$R_1\cdot\sin c((\omega R_1/\pi):R_2\cdot\sin c((\omega R_2/\pi):R_3\cdot\mathrm{sinc}((\omega R_3/\pi) \qquad (19)$$

The ratio of the radii $R_1$, $R_2$ and $R_3$ is thus computed (i.e., established) by use of expression (19).

As described, there is no need to subject all radii $R_1$, $R_2$ and $R_3$ to the image touch-up process. That is, the process need only be carried out on the radii $R_1$, $R_2$ and $R_3$ computed with expressions (16) and (17) above, or on the radii $R_1$, $R_2$ and $R_3$ which satisfy expression (19).

Another image touch-up process performed by the image processing apparatus 3 is described below by again referring to the flowchart of FIG. 10. This time, the process involves creating a sharply-focused image by touching up two out-of-focus images with different degrees of defocusing.

In step S1 of FIG. 10, the processing circuit 21 reads from the image pickup device 2 image data representing a plurality of images (two images in this example) to be touched up (i.e., to be brought into focus). The image data are held temporarily in the data memory 23 following input through the I/O terminal 27, I/O interface 26 and bus 25. Two images $G_1(x, y)$ and $G_2(x, y)$ are now placed in the data memory 23.

In step S2, the input unit 28 is used to input degrees of defocusing (i.e., radii of circles of confusion) with respect to the data representative of the two images read in step S1. Specifically, the user operates the input unit 28 to enter different degrees of defocusing regarding the two images. This establishes two images $G_1(x, y, R_1)$ and $G_2(x, y, R_2)$.

In step S3, the processing circuit 21 reads the data of the two images from the data memory 23 to compute weights $W_1$ and $W_2$. The weights $W_1$ and $W_2$ are computed in such a manner that the weight $H_{2C}$ shown in expression (11) is minimized on condition that $L>(R_1-R_2)$. The processing circuit 21 stores the computed weights $W_1$ and $W_2$ into the data memory 23.

In step S4, the processing circuit 21 computes an average of each of the two images whose data are held in the data memory 23. Specifically, the processing circuit 21 computes averages of the images $G_1(x, y, R_1)$ and $G_2(x, y, R_2)$ using expressions (12) and (13) respectively.

In step S5, the processing circuit 21 performs computations with expression (20) below on the averages of the two-image data computed in step S4, i.e., on images $h_1(x, y)$ and $h_2(x, y)$ to acquire a weighted average using the weights $W_1$ and $W_2$ calculated in step S3:

$$H_2(x,y) = W_1 \cdot h_1(x,y) + W_2 \cdot h_2(x,y) \quad (20)$$

With expression (20) above, the images $h_1(x, y)$ and $h_2(x, y)$ are weighted by $W_1$ and $W_2$ respectively before being added up to provide an image $H_2$.

In step S5, the processing circuit 21 stores the computed image $H_2$ into the data memory 23.

In step S6, the processing circuit 21 reads the image $H_2$ that was computed and placed into the data memory 23 in step S5, and places the retrieved image temporarily in the frame memory 24. From the frame memory 24, the processing circuit 21 outputs the image to the image display unit 29 through the bus 25 and I/O interface 26. This terminates the image touch-up process.

As described, a sharply-focused image is obtained by subjecting two out-of-focus images with different degrees of defocusing (i.e., radii of different circles of confusion) to weighted averaging.

Alternatively, a sharply-focused image may be acquired by subjecting to weighted averaging not two or three but four or more out-of-focus images with different degrees of defocusing.

In such cases where multiple out-of-focus images with different degrees of defocusing are used to create a sharply-focused image, the weighted average involved is generally calculated by expression (21) below:

$$H_K(x, y) = \sum_{i=1}^{i=K} \sum_{j=1}^{i=J(i)} W_{ij} \frac{1}{2\pi} \int_0^{2\pi} G_i(x + T_{ij}\cos(\theta), y + T_{ij}\sin(\theta)) d\theta \quad (21)$$

where, $H_K(x, y)$ denotes the weighted average of images $G_1(x, y)$ having as many as k different circles of confusion (with radii $R_{1=1}$ through k). In expression (22) below, the distance $T_{ij}$ and weight $W_{ij}$ are set to be approximately zero when the value L is sufficiently large:

$$H_{K_C}(L, \{T_{il}\}) = \sum_{i=1}^{i=K} \sum_{j=i}^{i=J(i)} W_{ij} \cdot H_C(L, T_{ji}, R_i) \quad (22)$$

where, $H_{KC}(L, \{T_{ij}\})$ represents the weight of the image $H_K(x, y)$. The right-hand term in expression (22) above is defined by expression (6) given earlier.

Illustratively, given images with three different circles of confusion, the right-hand term is defined so that k=3, J(1)=1, J(2)=1, J(3)=1, $T_{11}=R_2$, $T_{21}=R_1$, $T_{31}=R_1+R_2-R_3$, $W_{11}=W_1=(\pi R_1)^2$, $W_{21}=W_{2=}-2\cdot(\pi R_2)^2$, and $W_{31}=W_3(\pi R_3)^2$.

Given images with two different circles of confusion, the right-hand term above is defined so that k=2, J(1)=1, J(2)=1, $T_{11}=R_2$, $T_{21}=R_1$, $W_{11}=W_1=(\pi R_1)^2$, and $W_{21}=W_2=1.2\cdot(\pi R_2)^2$.

In the manner described, a sharply-focused image is obtained on the basis of multiple out-of-focus images with different degrees of defocusing without movement of the lens.

In a preferred setup, the red, green and blue components of the light entering the lens 11 may be arranged to undergo weighted averaging as different images with different degrees of defocusing. The arrangement, if implemented, allows for lenses whose chromatic aberration is appreciable and cannot be ignored.

When a picture of a scene with different depths is taken, the picture may be divided into image segments whose varied depths are regarded as different degrees of defocusing. Subjecting these image segments to weighted averaging creates what is known as a pan-focused image (i.e., an image depicting the nearest object through the farthest being all in focus).

The series of steps described above may be executed either by hardware or by software. For software-based processing to take place, programs constituting the software may be either incorporated beforehand in dedicated hardware or installed upon use from a suitable program storage medium into a general-purpose personal computer or like equipment capable of executing diverse functions.

As shown in FIG. 3, the storage medium is offered to users apart from the computer not only as a package medium constituted by the magnetic disc (including floppy discs) 41, magneto-optical disc (including MD (Mini-disc), a registered trademark) 42, optical disc (including CD-ROM (compact disc-read only memory) and DVD (digital versatile disc)) 43, or semiconductor memory 44; but also in the form of the program memory 22 or like built-in memory containing the programs and incorporated beforehand in the computer.

In this specification, the steps which are stored on a program storage medium and which describe the programs to be executed represent not only processes that are carried out in the depicted sequence (i.e., on a time series basis) but also those that are conducted parallelly or individually.

As described and through the use of the inventive image processing apparatus, image processing method, and storage medium containing the inventive program, weights of multiple picked-up images of a target object are computed, and averages of these images are calculated. A weighted average is then computed on the basis of the computed weights and of the averages of the multiple images, whereby an optimum image of the target object is created. The apparatus, method and program according to the invention thus permit creation of sharply-focused images at low cost.

As many apparently different embodiments of this invention may be made without departing from the spirit and scope thereof, it is to be understood that the invention is not limited to the specific embodiments thereof except as defined in the appended claims.

What is claimed is:

1. An image processing apparatus for processing images picked up on a plurality of image pickup planes having different distances to a lens, the apparatus comprising:

acquiring means for acquiring a plurality of images of a target object picked up on said plurality of image pickup planes;

first computing means for computing weights of said plurality of images acquired by said acquiring means;

second computing means for computing averages of said plurality of images acquired by said acquiring means; and image creating means for creating an optimum image of said target object by obtaining a weighted average based on said weights computed by said first computing means and on said averages of said plurality of images computed by said second computing means.

2. An image processing apparatus according to claim 1, further comprising image pickup means for picking up images of said target object on said plurality of image pickup planes.

3. An image processing method for use with an image processing apparatus for processing images picked up on a plurality of image pickup planes having different distances to a lens, the method comprising the steps of:

acquiring a plurality of images of a target object picked up on said plurality of image pickup planes;

firstly computing weights of said plurality of images acquired in said acquiring step;

secondly computing averages of said plurality of images acquired in said acquiring step; and creating an optimum image of said target object by obtaining a weighted average based on said weights computed in said first computing step and on said averages of said plurality of images computed in said second computing step.

4. A storage medium which stores a computer-readable program for use with an image processing apparatus for processing images picked up on a plurality of image pickup planes having different distances to a lens, said program comprising the steps of:

acquiring a plurality of images of a target object picked up on said plurality of image pickup planes;

firstly computing weights of said plurality of images acquired in said acquiring step;

secondly computing averages of said plurality of images acquired in said acquiring step; and creating an optimum image of said target object by obtaining a weighted average based on said weights computed in said first computing step and on said averages of said plurality of images computed in said second computing step.

* * * * *